United States Patent
Hendry et al.

(10) Patent No.: US 12,160,617 B2
(45) Date of Patent: Dec. 3, 2024

(54) IN-LOOP FILTERING-BASED IMAGE CODING DEVICE AND METHOD

(71) Applicant: LG ELECTRONICS INC., Seoul (KR)

(72) Inventors: Hendry Hendry, Seoul (KR); Seethal Paluri, Seoul (KR)

(73) Assignee: LG ELECTRONICS INC., Seoul (KR)

(*) Notice: Subject to any disclaimer, the term of this patent is extended or adjusted under 35 U.S.C. 154(b) by 164 days.

(21) Appl. No.: 17/800,482

(22) PCT Filed: Feb. 25, 2021

(86) PCT No.: PCT/KR2021/002377
§ 371 (c)(1),
(2) Date: Aug. 17, 2022

(87) PCT Pub. No.: WO2021/172891
PCT Pub. Date: Sep. 2, 2021

(65) Prior Publication Data
US 2023/0096855 A1 Mar. 30, 2023

Related U.S. Application Data

(60) Provisional application No. 62/981,521, filed on Feb. 25, 2020.

(51) Int. Cl.
*H04N 19/80* (2014.01)
*H04N 19/172* (2014.01)
*H04N 19/46* (2014.01)

(52) U.S. Cl.
CPC .......... *H04N 19/80* (2014.11); *H04N 19/172* (2014.11); *H04N 19/46* (2014.11)

(58) Field of Classification Search
None
See application file for complete search history.

(56) References Cited

U.S. PATENT DOCUMENTS

2023/0085937 A1* 3/2023 Deshpande ............ H04N 19/70

FOREIGN PATENT DOCUMENTS

| KR | 10-2014-0029436 A | 3/2014 |
| KR | 10-2017-0125153 A | 11/2017 |
| WO | 2020/011796 A1 | 1/2020 |

OTHER PUBLICATIONS

Benjamin Bross et al., "Versatile Video Coding (Draft 8)", JVET-Q2001-vC, Joint Video Experts Team JVET) of ITU-T SG 16 WP 3 and ISO/IEC JTC 1/SC 29/WG 11, 17th Meeting: Brussels, BE, Jan. 7-17, 2020, pp. 1-481, see pp. 33-173, 220, 300-301 and 334-374.

Chih-Yao Chiu et al., "AHG9: On signalling of virtual boundary", JVET-Q0181-v2, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-6, see pp. 1-6; and figure 2.

* cited by examiner

*Primary Examiner* — Stuart D Bennett
(74) *Attorney, Agent, or Firm* — Bryan Cave Leighton Paisner LLP

(57) ABSTRACT

According to embodiments of the present document, information for performing in-loop filtering by crossing virtual boundaries can be efficiently signaled. In one embodiment, the value of a virtual boundary-related flag signaled through a picture header can be determined on the basis of the value of a virtual boundary-related flag signaled through an SPS.

10 Claims, 11 Drawing Sheets

IN-LOOP FILTERING-BASED IMAGE CODING DEVICE AND METHOD

This application is a National Stage Application of International Application No. PCT/KR2021/002377, filed on Feb. 25, 2021, which claims the benefit of and priority to U.S. Provisional Application No. 62/981,521, filed on Feb. 25, 2020, which are hereby incorporated by reference in their entirety for all purposes as if fully set forth herein.

BACKGROUND OF THE DISCLOSURE

Field of the Disclosure

The present document relates to an apparatus and method for image coding based on in-loop filtering.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

Specifically, an in-loop filtering procedure is performed to increase subjective/objective visual quality, and there is discussion on a method for increasing signaling efficiency of information for performing in-loop filtering based on virtual boundaries.

SUMMARY

According to an embodiment of the present document, a method and an apparatus for increasing image/video coding efficiency are provided.

According to an embodiment of the present document, a method and apparatus for applying efficient filtering application are provided.

According to an embodiment of the present document, a method and apparatus for effectively applying deblocking, sample adaptive offset (SAO), and adaptive loop filtering (ALF) are provided.

According to an embodiment of the present document, in-loop filtering may be performed based on virtual boundaries.

According to an embodiment of the present document, a sequence parameter set (SPS) may include a virtual boundaries enabled flag indicating whether in-loop filtering is performed across virtual boundaries.

According to an embodiment of the present document, in-loop filtering may be performed across the virtual boundaries, based on the virtual boundaries enabled flag.

According to an embodiment of the present document, a value of a virtual boundaries-related flag to be signaled through a picture header may be determined based on a value of a virtual boundaries-related flag to be signaled through an SPS.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

According to an embodiment of the present document, overall image/video compression efficiency may be improved.

According to an embodiment of the present document, subjective/objective visual quality may be improved through efficient filtering.

An in-loop filtering procedure based on virtual boundaries according to an embodiment of present document may save a hardware resource.

According to an embodiment of the present document, the in-loop filtering procedure based on the virtual boundaries may be effectively performed, and filtering performance may be improved.

According to an embodiment of the present document, information for in-loop filtering based on the virtual boundaries may be effectively signaled.

DESCRIPTION OF EXEMPLARY EMBODIMENTS

Figure 1:
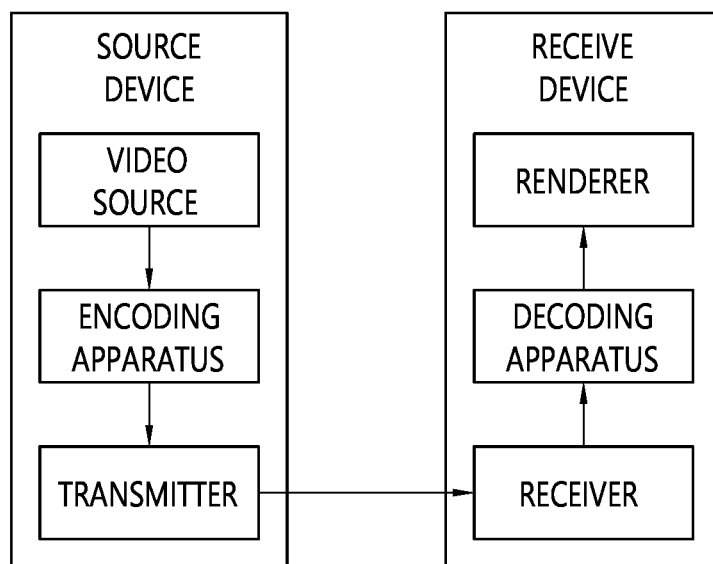
FIG. 1 schematically shows an example of a video/image coding system to which embodiments of the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of this document, embodiments in which configurations are combined and/or separated are included in the scope of claims.

Hereinafter, examples of the present embodiment will be described in detail with reference to the accompanying drawings. In addition, like reference numerals are used to indicate like elements throughout the drawings, and the same descriptions on the like elements will be omitted.

This document relates to video/image coding. For example, methods/embodiments disclosed in this document may be related to the versatile video coding (VVC) standard (ITU-T Rec. H.266), the next-generation video/image coding standard after VVC, or other video coding related standards (e.g., high efficiency video coding (HEVC) standard (ITU-T Rec. H.265), essential video coding (EVC) standard, AVS2 standard, and the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In the present specification, "at least one of A and B" may mean "only A", "only B", or "both A and B". Further, in the present specification, the expression "at least one of A or B" or "at least one of A and/or B" may be interpreted the same as "at least one of A and B".

Further, in the present specification, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present specification, technical features individually explained in one drawing may be individually implemented, or may be simultaneously implemented.

FIG. 1 illustrates an example of a video/image coding system to which the disclosure of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
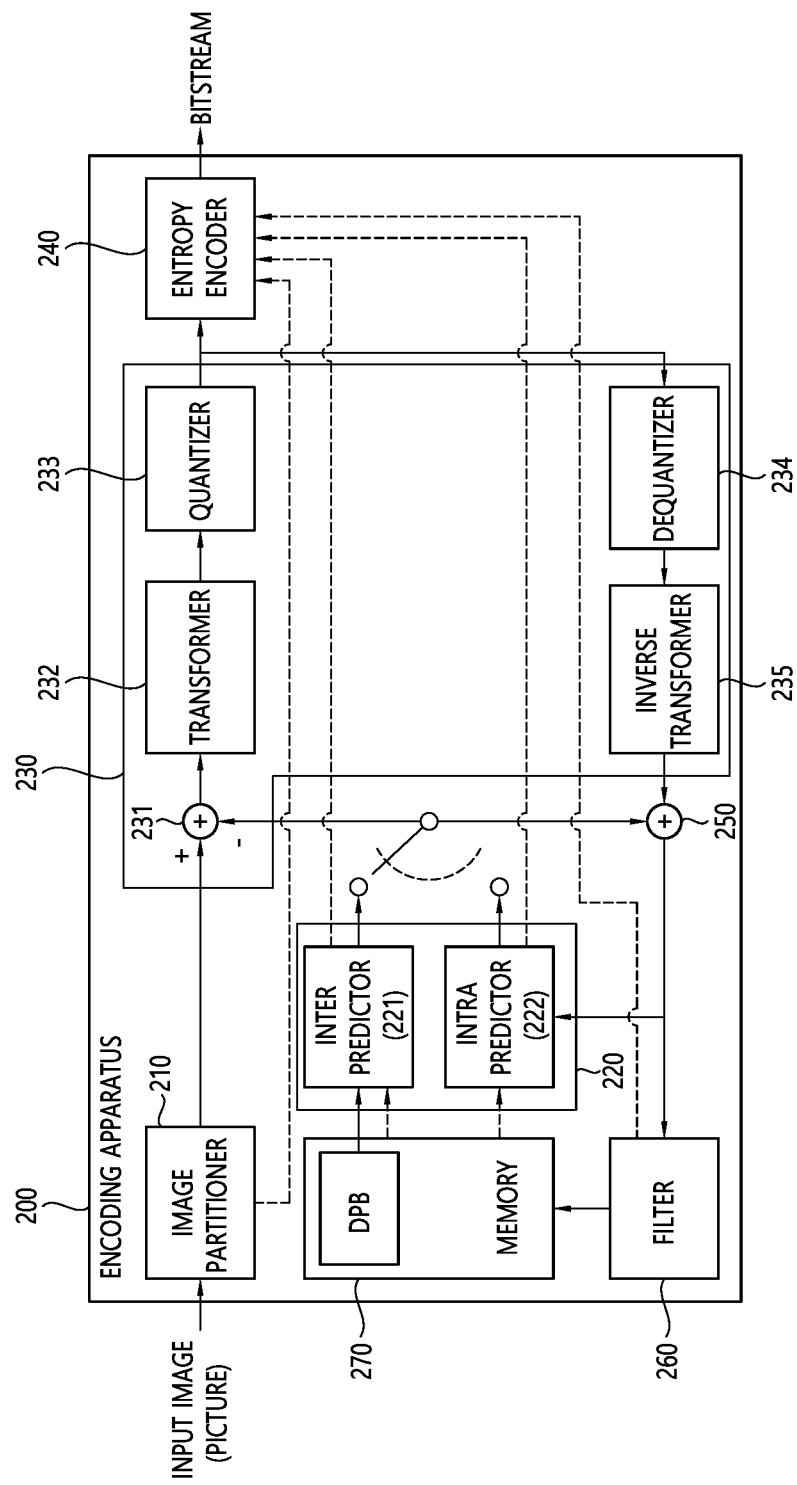
FIG. 2 is a view schematically illustrating the configuration of a video/image encoding apparatus to which embodiments of the present disclosure may be applied.

FIG. 2 is a diagram schematically illustrating the configuration of a video/image encoding apparatus to which the disclosure of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The subtractor 231 may generate a residual signal (residual block, residual samples, or residual sample array) by subtracting a prediction signal (predicted block, prediction samples, or prediction sample array) output from the predictor 220 from an input image signal (original block, original samples, or original sample array), and the generated residual signal is transmitted to the transformer 232. The predictor 220 may perform prediction for a processing target block (hereinafter, referred to as a "current block"), and generate a predicted block including prediction samples for the current block. The predictor 220 may determine whether intra prediction or inter prediction is applied on a current block or in a CU unit. As described later in the description of each prediction mode, the predictor may generate various kinds of information related to prediction, such as prediction mode information, and transfer the generated information to the entropy encoder 240. The information on the prediction may be encoded in the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to the transform obtained based on a prediction signal generated using all previously reconstructed pixels. In addition, the transform process may be applied to square pixel blocks having the same size, or may be applied to blocks having a variable size rather than a square.

The quantizer 233 may quantize the transform coefficients and transmit them to the entropy encoder 240, and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order, and generate information on the quantized transform coefficients based on the quantized transform coefficients in the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction together with or separately from the quantized transform coefficients (e.g., values of syntax elements and the like). Encoded information (e.g., encoded video/image information) may be transmitted or stored in the unit of a network abstraction layer (NAL) in the form of a bitstream. The video/image information may further include information on various parameter sets, such as an adaptation parameter set (APS), a picture parameter set (PPS), a sequence parameter set (SPS), or a video parameter set (VPS). In addition, the video/image information may further include general constraint information. In the present document, information and/or syntax elements being signaled/transmitted to be described later may be encoded through the above-described encoding procedure, and be included in the bitstream. The bitstream may be transmitted through a network, or may be stored in a digital storage medium. Here, the network may include a broadcasting network and/or a communication network, and the digital storage medium may include various storage media, such as USB, SD, CD, DVD, Blu-ray, HDD, SSD, and the like. A transmitter (not illustrated) transmitting a signal output from the entropy encoder 240 and/or a storage unit (not illustrated) storing the signal may be configured as an internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed samples, or reconstructed sample array). If there is no residual for the processing target block, such as a case that a skip mode is applied, the predicted block may be used as the reconstructed block. The generated reconstructed signal may be used for intra prediction of a next processing target block in the current picture, and may be used for inter prediction of a next picture through filtering as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset (SAO), an adaptive loop filter, a bilateral filter, and the like. The filter 260 may generate various kinds of information related to the filtering, and transfer the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
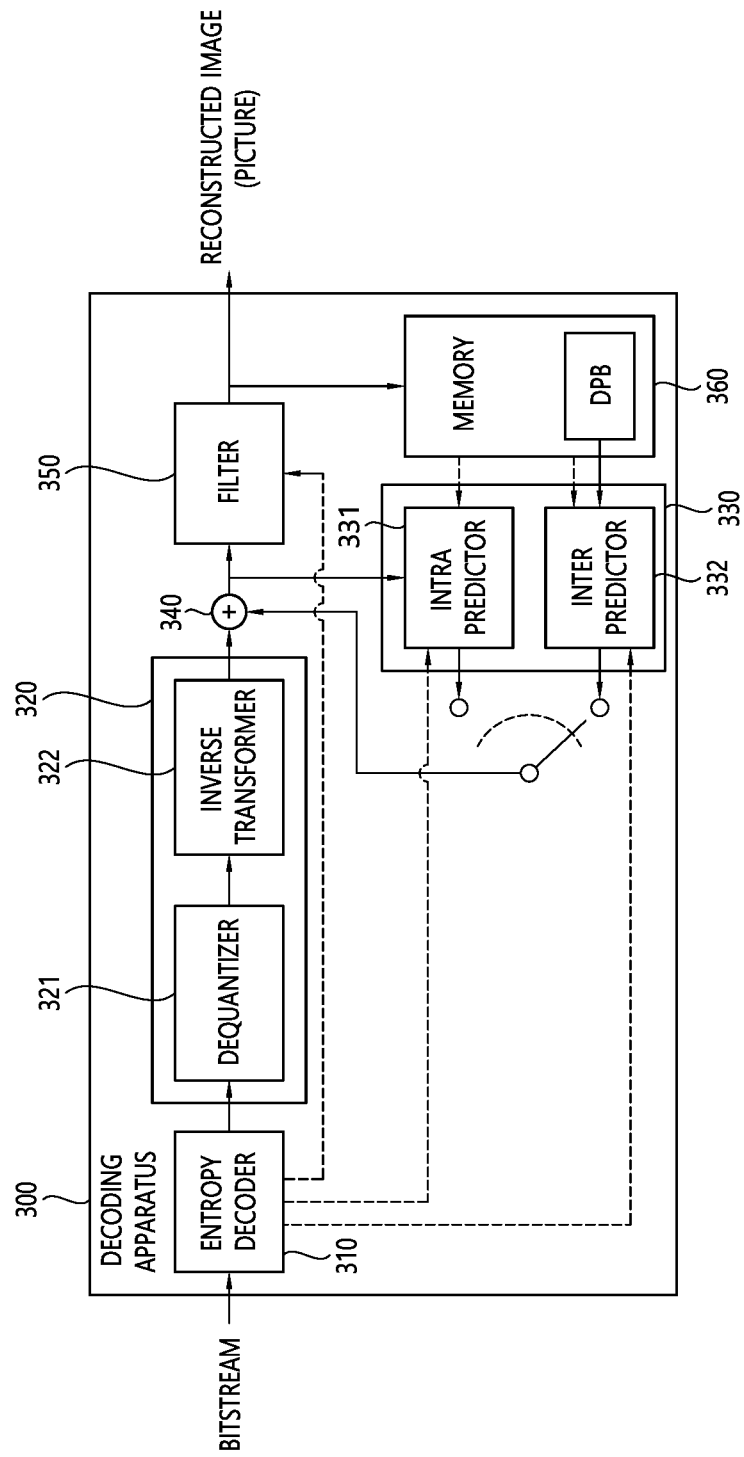
FIG. 3 is a view schematically illustrating the configuration of a video/image decoding apparatus to which embodiments of the present disclosure may be applied.

FIG. 3 is a diagram for schematically explaining the configuration of a video/image decoding apparatus to which the disclosure of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding has been performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a constituent element of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The intra predictor 332 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 332 may determine the prediction mode to be applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 331 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor 330. If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture having already been reconstructed. The stored motion information may be transferred to the inter predictor 331 so as to be utilized as the motion information of the spatial neighboring block or the motion information of the temporal neighboring block. The memory 360 may store reconstructed samples of reconstructed blocks in the current picture, and transfer the reconstructed samples to the intra predictor 332.

In the present specification, the embodiments described in the predictor 330, the dequantizer 321, the inverse transformer 322, and the filter 350 of the decoding apparatus 300 may also be applied in the same manner or corresponding to the predictor 220, the dequantizer 234, the inverse transformer 235, and the filter 260 of the encoding apparatus 200.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

In this document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In this document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of this document as well.

The predictor of the encoding apparatus/decoding apparatus may derive prediction samples by performing inter prediction in units of blocks. Inter prediction can be a prediction derived in a manner that is dependent on data elements (e.g. sample values or motion information, etc) of picture(s) other than the current picture. When the inter prediction is applied to the current block, based on the reference block (reference sample arrays) specified by the motion vector on the reference picture pointed to by the reference picture index, the predicted block (prediction sample arrays) for the current block can be derived. In this case, in order to reduce the amount of motion information transmitted in the inter prediction mode, the motion information of the current block may be predicted in units of blocks, subblocks, or samples based on the correlation between the motion information between neighboring blocks and the current block. The motion information may include the motion vector and the reference picture index. The motion information may further include inter prediction type (L0 prediction, L1 prediction, Bi prediction, etc.) information. When the inter prediction is applied, the neighboring blocks may include a spatial neighboring block existing in the current picture and a temporal neighboring block existing in the reference picture. The reference picture including the reference block and the reference picture including the temporal neighboring block may be the same or different. The temporal neighboring block may be called a collocated reference block, a collocated CU (colCU), etc., and a reference picture including the temporally neighboring block may be called a collocated picture (colPic). For example, a motion information candidate list may be constructed based on neighboring blocks of the current block, and a flag or index information indicating which candidate is selected (used) to derive the motion vector and/or the reference picture index of the current block may be signaled. The inter prediction may be performed based on various prediction modes. For example, in the skip mode and the merge mode, the motion information of the current block may be the same as the motion information of a selected neighboring block. In the skip mode, unlike the merge mode, a residual signal may not be transmitted. In the case of a motion vector prediction (MVP) mode, a motion vector of a selected neighboring block may be used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. The prediction based on the L0 motion vector may be called L0 prediction, the prediction based on the L1 motion vector may be called the L1 prediction, and the prediction based on both the L0 motion vector and the L1 motion vector may be called a bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are previous than the current picture in output order as reference pictures, and the reference picture list L1 may include pictures that are subsequent than the current picture in output order. The previous pictures may be called forward (reference) pictures, and the subsequent pictures may be called backward (reference) pictures. The reference picture list L0 may further include pictures that are subsequent than the current picture in output order as reference pictures. In this case, the previous pictures may be indexed first, and the subsequent pictures may be indexed next in the reference picture list L0. The reference picture list L1 may further include pictures previous than the current picture in output order as reference pictures. In this case, the subsequent pictures may be indexed first in the reference picture list 1 and the previous pictures may be indexed next. Here, the output order may correspond to a picture order count (POC) order.

Figure 4:
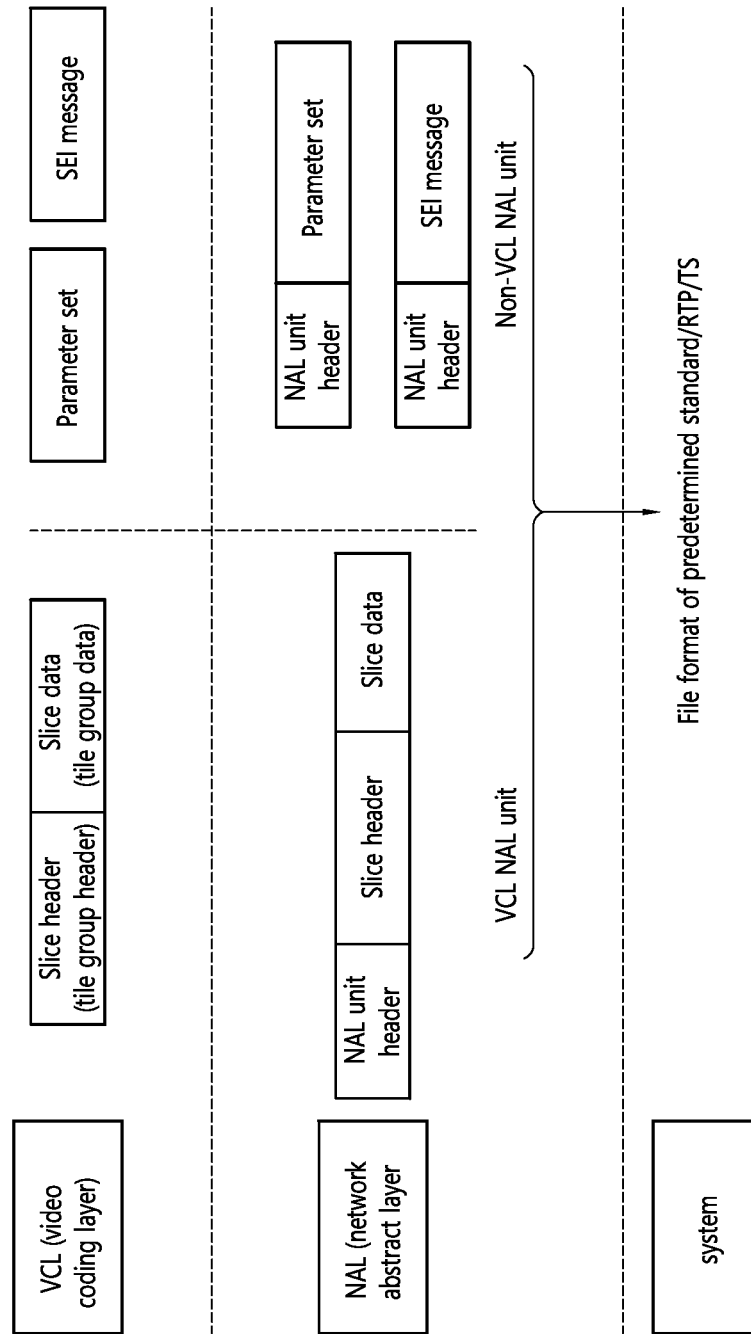
FIG. 4 exemplarily shows a hierarchical architecture for a coded video/image.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a slice may be mixed or replaced with a tile group. Also, in this document, a slice header may be mixed or replaced with a type group header.

The slice header (slice header syntax or slice header information) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

Meanwhile, in order to compensate for a difference between an original image and a reconstructed image due to an error occurring in a compression encoding procedure such as quantization, an in-loop filtering procedure may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF procedure may be performed after the deblocking filtering procedure and/or the SAO procedure are complete. However, even in this case, the deblocking filtering procedure and/or the SAO procedure may be omitted.

Hereinafter, picture reconstruction and filtering will be described in detail. In image/video coding, a reconstructed block may be generated based on intra prediction/inter prediction in each block unit, and a reconstructed picture including the reconstructed blocks may be generated. When the current picture/slice is an I picture/slice, blocks included in the current picture/slice may be reconstructed based on only intra prediction. Meanwhile, when the current picture/slice is a P or B picture/slice, blocks included in the current picture/slice may be reconstructed based on intra prediction or inter prediction. In this case, intra prediction may be applied to some blocks in the current picture/slice, and inter prediction may be applied to the remaining blocks.

The intra prediction may refer to prediction which generates prediction samples for the current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include samples adjacent to the left boundary of the current block having a size of nW×nH and a total of 2×nH samples neighboring the bottom-left, samples adjacent to the top boundary of the current block and a total of 2×nW samples neighboring the top-right, and one sample neighboring the top-left of the current block. Alternatively, the neighboring reference samples of the current block may include a plurality of columns of upper neighboring samples and a plurality of rows of left neighboring samples. In addition, the neighboring reference samples of the current block may include a total of nH samples adjacent to the right boundary of the current block having a size of nW×nH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to be used for prediction by substituting not-available samples with the available samples. Alternatively, neighboring reference samples to be used for prediction may be configured through interpolation of the available samples.

When the neighboring reference samples are derived, (i) the prediction sample may be derived based on the average or interpolation of neighboring reference samples of the current block, and (ii) the prediction sample may be derived based on the reference sample present in a specific (prediction) direction for the prediction sample among the periphery reference samples of the current block. The case of (i) may be called a non-directional mode or a non-angular mode and the case of (ii) may be called a directional mode or an angular mode. The prediction sample may also be generated through interpolation between the second neighboring sample and the first neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples using a linear model. This case may be called an LM mode. In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC). In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction. In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra sub-partitions (ISP) or ISP based intra prediction. The above-described intra prediction methods may be called an intra prediction type separately from the intra prediction mode in the sections 1.2. The intra prediction type may be called in various terms such as an intra prediction technique or an additional intra prediction mode. For example, the intra prediction type (or additional intra prediction mode) may include at least one of the above-described LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, optionally, post-filtering may be performed on the derived predicted sample.

Specifically, the intra prediction procedure may include an intra prediction mode/type determination step, a neighboring reference sample derivation step, and an intra prediction mode/type based prediction sample derivation step. In addition, optionally, a post-filtering step may be performed on the derived predicted sample.

A modified reconstructed picture may be generated through the in-loop filtering procedure, and the modified reconstructed picture may be output as a decoded picture at the decoding apparatus and may also be stored in a decoded picture buffer or memory of the encoding apparatus/decoding apparatus and used as a reference picture in the inter prediction procedure at the time of encoding/decoding a picture later. The in-loop filtering procedure may include a deblocking filtering procedure, a sample adaptive offset (SAO) procedure, and/or an adaptive loop filter (ALF) procedure as described above. In this case, one or some of the deblocking filtering procedure, sample adaptive offset (SAO) procedure, adaptive loop filter (ALF) procedure, and bilateral filter procedure may be sequentially applied or all of them may be sequentially applied. For example, the SAO procedure may be performed after the deblocking filtering procedure is applied to the reconstructed picture. Alternatively, for example, the ALF procedure may be performed after the deblocking filtering procedure is applied to the reconstructed picture. This may also be performed in the encoding apparatus.

The deblocking filtering is a filtering scheme which removes distortion at boundaries between blocks in the reconstructed picture. The deblocking filtering procedure may, for example, derive a target boundary from the reconstructed picture, determine a boundary strength (bS) for the target boundary, and perform deblocking filtering on the target boundary based on the bS. The bS may be determined based on a prediction mode, a motion vector difference, whether a reference picture is the same, whether a non-zero significant coefficient exists, etc., of two blocks adjacent to the target boundary.

The SAO is a scheme which compensates for an offset difference between the reconstructed picture and the original picture on a sample basis. For example, the SAO may be applied based on a type such as a band offset, an edge offset, or the like. According to the SAO, samples may be classified into different categories according to each SAO type, and an offset value may be added to each sample based on the category. The filtering information for the SAO may include information on whether the SAO is applied, SAO type information, and SAO offset value information. The SAO may be applied to the reconstructed picture after the deblocking filtering is applied.

The adaptive loop filter (ALF) is a scheme which filters a reconstructed picture on a sample basis based on filter coefficients according to a filter shape. The encoding apparatus may determine whether to apply the ALF, an ALF shape and/or an ALF filtering coefficient, etc. by comparing the reconstructed picture and the original picture and may signal the determination result to the decoding apparatus. That is, the filtering information for the ALF may include information on whether the ALF is applied, ALF filter shape information, ALF filtering coefficient information, and the like. The ALF may be applied to the reconstructed picture after the deblocking filtering is applied.

Figure 5:
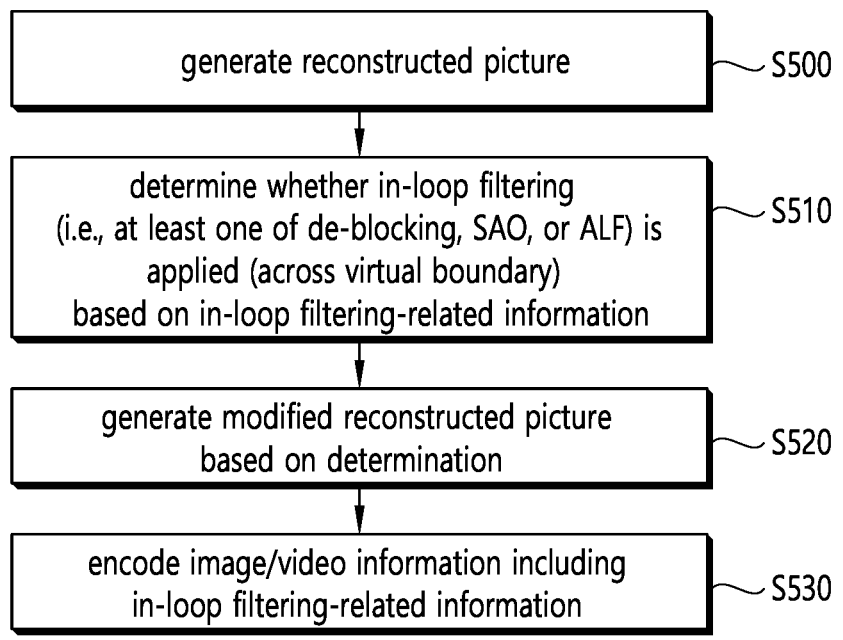
FIG. 5 is a flowchart illustrating an encoding method based on filtering in an encoding apparatus.

FIG. 5 is a flowchart illustrating an encoding method based on filtering in an encoding apparatus. The method of FIG. 5 may include steps S500 to S530.

In the step S500, the encoding apparatus may generate a reconstructed picture. The step S500 may be performed based on the aforementioned reconstructed picture (or reconstructed samples) generation procedure.

In the step S510, the encoding apparatus may determine whether in-loop filtering is applied (across a virtual boundary) based on in-loop filtering-related information. Herein, the in-loop filtering may include at least one of the aforementioned de-blocking filtering, SAO, or ALF.

In the step S520, the encoding apparatus may generate a modified reconstructed picture (modified reconstructed samples) based on the determination of the step S510. Herein, the modified reconstructed picture (modified reconstructed samples) may be a filtered reconstructed picture (filtered reconstructed samples).

In the step S530, the encoding apparatus may encode image/video information including the in-loop filtering-related information, based on the in-loop filtering procedure.

Figure 6:
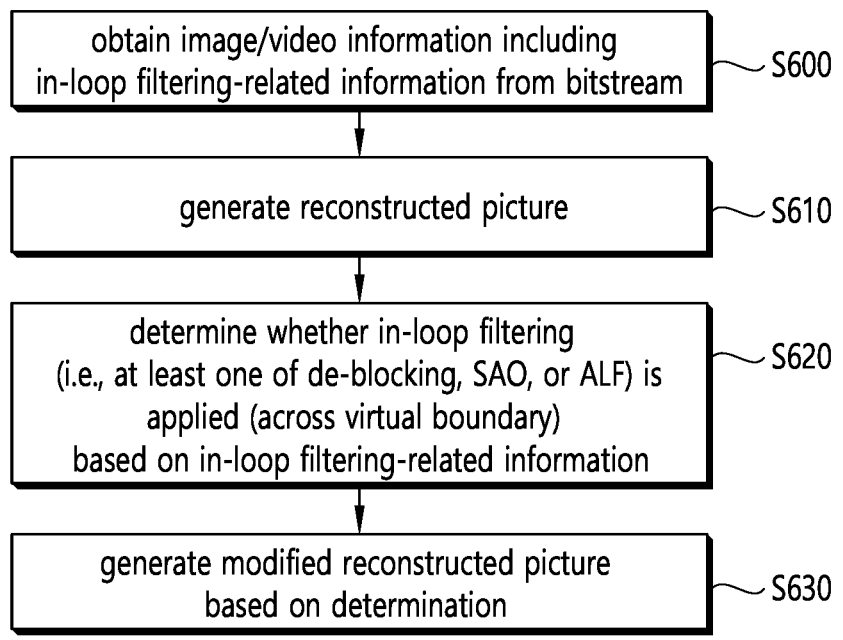
FIG. 6 is a flowchart illustrating a decoding method based on filtering in a decoding apparatus.

FIG. 6 is a flowchart illustrating a decoding method based on filtering in a decoding apparatus. The method of FIG. 6 may include steps S600 to S630.

In the step S600, the decoding apparatus may obtain image/video information including in-loop filtering-related information from a bitstream. Herein, the bitstream may be based on encoded image/video information transmitted from the encoding apparatus.

In the step S610, the decoding apparatus may generate a reconstructed picture. The step S610 may be performed based on the aforementioned reconstructed picture (or reconstructed samples).

In the step S620, the decoding apparatus may determine whether in-loop filtering is applied (across a virtual boundary) based on the in-loop filtering-related information. Herein, the in-loop filtering may include at least one of the aforementioned de-blocking filtering, SAO, or ALF.

In the step S630, the decoding apparatus may generate a modified reconstructed picture (modified reconstructed samples) based on the determination of the step S620. Herein, the modified reconstructed picture (modified reconstructed samples) may be a filtered reconstructed picture (filtered reconstructed samples).

As described above, the in-loop filtering procedure may be applied to the reconstructed picture. In this case, a virtual boundary may be defined to further improve subjective/objective visual quality of the reconstructed picture, and the in-loop filtering procedure may be applied across the virtual boundary. The virtual boundary may include, for example, a discontinuous edge such as a 360-degree image, a VR image, a bound, a Picture In Picture (PIP), or the like. For example, the virtual boundary may be present at a predetermined position, and a presence and/or position thereof may be signaled. For example, the virtual boundary may be located at an upper fourth sample line of a CTU row (specifically, for example, above the upper fourth sample of the CTU row). As another example, information on the present and/or position of the virtual boundary may be signaled through HLS. The HLS may include the SPS, the PPS, the picture header, the slice header, or the like as described above.

Hereinafter, a high-level syntax signaling and semantics will be described according to embodiments of the present disclosure.

An embodiment of the present document may include a method of controlling loop filters. The present method for controlling the loop filters may be applied to a reconstructed picture. In-loop filters (loop filters) may be used for decoding of encoded bitstreams. The loop filters may include the aforementioned deblocking, SAO, and ALF. The SPS may include flags related to each of the deblocking, SAO, and ALF. The flags may indicate whether each of tools is available for the coding of a coded layer video sequence (CLVS) or coded video sequence (CVS) referring to the SPS.

When the loop filters are available for the CVS, the applying of the loop filters may be controlled not to be across specific boundaries. For example, whether the loop filters are across sub-picture boundaries may be controlled. In addition, whether the loop filters are across tile boundaries may be controlled. In addition thereto, whether the loop filters are across virtual boundaries may be controlled. Herein, the virtual boundaries may be defined on CTUs based on availability of a line buffer.

Regarding whether the in-loop filtering procedure is performed across the virtual boundary, in-loop filtering-related information may include at least one of an SPS virtual boundaries enabled flag (a virtual boundaries enabled flag in an SPS), an SPS virtual boundaries present flag, a picture header virtual boundaries present flag, an SPS picture header virtual boundaries present flag, or information on a virtual boundaries position.

In embodiments included in the present document, the information on the virtual boundaries position may include information on an x-coordinate of a vertical virtual boundary and/or information on a y-coordinate of a horizontal virtual boundary. Specifically, the information on the virtual boundaries position may include the information on the x-coordinate of the vertical virtual boundary and/or the information on the y-axis of the horizontal virtual boundary in units of luma samples. In addition, the information on the virtual boundaries position may include information on the number of pieces of information (syntax elements) on the x-coordinate of the vertical virtual boundary which is present in the SPS. In addition, the information on the virtual boundaries position may include information on the number of pieces of information (syntax elements) on the y-coordinate of the horizontal virtual boundary which is present in the SPS. Alternatively, the information on the virtual boundaries position may include information on the number of pieces of information (syntax elements) on the x-coordinate of the vertical virtual boundary which is present in a picture header. In addition, the information on the virtual boundaries position may include information on the number of pieces of information (syntax elements) on the y-coordinate of the horizontal virtual boundary which is present in the picture header.

According to the existing embodiments regarding signaling of virtual boundaries, even if the virtual boundaries enabled flag (sps_virtual_boundaries_enabled_flag) is true (or 1), all of flags (sps_virtual_boundaries_present_flag, ph_virtual_boundaries_present_flag) indicating a position of virtual boundaries-related information (e.g., information on positions of virtual boundaries) may be false (or 0). This causes an unnecessary and redundant procedure of signaling the virtual boundaries enabled flag even though no picture of the coded layer video sequence includes the virtual boundary.

According to an embodiment of the present document, a relationship between values of flags may be configured in a semantics of syntax elements related to virtual boundaries. For example, when a feature of disabling loop filters which are across virtual boundaries is available, it may be restricted to define at least one picture having a virtual boundary position.

The following table shows an exemplary semantics for explaining syntax elements (e.g., sps_virtual_boundaries_enabled_flag, sps_virtual_boundaries_present_flag, ph_virtual_boundaries_present_flag)/relationship thereof included in a sequence parameter set (SPS) and/or a picture header.

TABLE 1

It is a requirement of bitstream conformance that, when sps_virtual_boundaries_enabled_flag is equal to 1 and sps_virtual_boundaries_present_flag is equal to 0, there shall be at least one picture referring to the SPS with the value of ph_virtual_boundaries_present_flag is equal to 1.

The following table shows an exemplary semantics of a picture parameter set (PPS) according to the present embodiment.

TABLE 2

| pic_parameter_set_rbsp( ) { | Descriptor |
|---|---|
| ... | |
| pps_virtual_boundaries_present_in_ph_flag | u(1) |
| ... | |
| } | |

The following table shows an exemplary semantics for explaining syntax elements included in the syntax of the table above.

TABLE 3 pps_virtual_boundaries_present_in_ph_flag equal 1 specifies that virtual boundary information of virtual boundaries may be signalled in the PH referring to the PPS. pps_virtual_boundaries_present_in_ph_flag equal to 0 specifies that virtual boundary information of virtual boundaries is not signalled in the PH referring to the PPS. When sps_virtual_boundaries_present_flag is equal to 1, the value of pps_virtual_boundaries_present_in_ph_flag shall be equal to 0.

The following table shows an exemplary semantics of a picture header according to the present embodiment.

TABLE 4

| picture_header_structure( ) { | Descriptor |
|---|---|
| ... | |
| if( sps_virtual_boundaries_enabled_flag && | |
|     pps_virtual_boundaries_present_in_ph_flag ) { | |
|     ph_virtual_boundaries_present_flag | u(1) |
|     if( ph_virtual_boundaries_present_flag ) { | |
|         ph_num_ver_virtual_boundaries | u(2) |
|         for( i = 0; i < ph_num_ver_virtual_boundaries; i++ ) | |
|             ph_virtual_boundaries_pos_x[ i ] | u(13) |
|         ph_num_hor_virtual_boundaries | u(2) |
|         for( i = 0; i < ph_num_hor_virtual_boundaries; i++ ) | |
|             ph_virtual_boundaries_pos_y[ i ] | u(13) |
|     } | |
| } | |
| ... | |
| } | |

In the existing embodiments, virtual boundaries are used to support a gradual decoding refresh (GDR). However, it is not optimized since virtual boundary-related information may be signaled for a picture which is not necessary in practice when the GDR is available.

According to an embodiment of the present document, when the feature of disabling the loop filters which are across virtual boundaries and the GDR feature are available, a flag for indicating whether the virtual boundary is used to support only the GDR feature may be preset in a parameter set (e.g., SPS). In an example, the flag may be referred to as a virtual boundaries GDR usage specifying flag (or virtual_boudaries_used_for_gdr_only_flag). For example, when the virtual boundaries GDR usage specifying flag (or virtual_boudaries_used_for_gdr_only_flag) has a value of 1, the SPS virtual boundaries present flag (sps_virtual_boudaries_present_flag) may not be present and/or the SPS virtual boundaries present flag may have a value of 0. In addition, when the virtual boundaries GDR usage specifying flag (or virtual_boudaries_used_for_gdr_only_flag) has a value of 1, the picture header virtual boundaries present flag (ph_virtual_boundaries_present_flag) may be present only for a GDR picture and a last picture before a recovery point picture related to the GDR picture. When the picture header virtual boundaries present flag (ph_virtual_boundaries_present_flag) is not present, a value thereof may be inferred to be 0.

The following table shows an exemplary semantics of an SPS according to the present embodiment.

TABLE 5

| seq_parameter_set_rbsp( ) { | Descriptor |
|---|---|
| ... | |
| sps_virtual_boundaries_enabled_flag | u(1) |
| if( sps_virtual_boundaries_enabled_flag && | |
|     gdr_enabled_flag ) { | |
|     virtual_boundaries_used_for_gdr_only_flag | u(1) |
|     if( sps_virtual_boundaries_enabled_flag && | |
|         !virtual_boundaries_used_for_gdr_only_flag) { | |
|         sps_virtual_boundaries_present_flag | u(1) |
|         if( sps_virtual_boundaries_present_flag ) { | |
|             sps_num_ver_virtual_boundaries | u(2) |
|             for( i = 0; i < sps_num_ver_virtual_boundaries; i++) | |
|                 sps_virtual_boundaries_pos_x[ i ] | u(13) |
|             sps_num_hor_virtual_boundaries | u(2) |
|             for( i = 0; i < sps_num_hor_virtual_boundaries; i++) | |
|                 sps_virtual_boundaries_pos_y[ i ] | u(13) |
|         } | |
|     } | |
| } | |
| ... | |
| } | |

The following table shows an exemplary semantics for explaining syntax elements included in the syntax of the table above.

TABLE 6 virtual_boundaries_used_flag_gdr_only_flag equal 1 specifies that virtual boundaries
signalling is persent only in pictures that is being refreshed (i.e., picture between a gdr picture
to the last picture before the recovery point picture associated with the gdr picture, inclusive).
virtual_boundaries_used_for_gdr_only_flag equal 0 specifies that the above does not apply.

The following table shows an exemplary semantics of a picture header according to the present embodiment.

TABLE 7

| picture_header_structure( ) { | Descriptor |
|---|---|
| ... | |
| if( (sps_virtual_boundaries_enabled_flag | |
| && !sps_virtual_boundaries_present_flag ) \|\| | |
| (virtual_boundaries_used_for_gdr_only_flag && | |
| PicOrderCntVal >= GdrPicOrderCntVal && | |
| PicOrderCntVal < RpPicOrderCntVal ) ) { | |
| ph_virtual_boundaries_present flag | u(1) |
| if( ph_virtual_boundaries_present_flag) { | |
| ph_num_ver_virtual_boundaries | u(2) |
| for( i = 0; i < ph_num_ver_virtual_boundaries; i++ ) | |
| ph_virtual_boundaries_pos_x[ i ] | u(13) |
| ph_num_hor_virtual_boundaries | u(2) |
| for( i = 0; i < ph_num_hor_virtual_boundaries; i++) | |
| ph_virtual_boundaries_pos_y[ i ] | u(13) |
| } | |
| } | |
| ... | |
| } | |

The following table shows an exemplary semantics for explaining syntax elements included in the syntax of the table above.

TABLE 8

...
gdr_pic_flag equal to 1 specifies the picture associated with the PH is a GDR picture.
gdr_pic_flag equal to 0 specifies that the picture associated with the PH is not a GDR picture.
When not present, the value of gdr_pic_flag is inferred to be equal to 0. When
gdr_enabled_flag is equal to 0, the value of gdr_pic_flag shall be equal to 0.
...
recovery_poc_cnt specifies the recovery point of decoded pictures in output order. If the current
picture is a GDR picture that is associated with the PH, and there is a picture picA that follows
the current GDR picture in decoding order in the CLVS that has PicOrderCntVal equal to the
PicOrderCntVal of the current GDR picture plus the value of recovery_poc_cnt, the picture picA
is referred to as the recovery point picture. Otherwise, the first picture in output order that has
PicOrderCntVal greater than the PicOrderCntVal of the current picture plus the value of
recovery_poc_cnt is referred to as the recovery point picture. The recovery point picture shall
not precede the current GDR picture in decoding order. The value of recovery_poc_cnt shall be
in the range of 0 to MaxPicOrderCntLsb − 1, inclusive.
When the current picture is a GDR picture, the variable RpPicOrderCntVal is derived as follows:
    GdrPicOrderCntVal = PicOrderCntVal
    RpPicOrderCntVal = PicOrderCntVal + recovery_poc_cnt
NOTE 2 - When gdr enabled flag is equal to 1 and PicOrderCntVal of the current picture is greater
than or equal to RpPicOrderCntVal of the associated GDR picture, the current and subsequent
decoded pictures in output order are exact match to the corresponding pictures produced by starting
the decoding process from the previous IRAP picture, when present, preceding the associated GDR
picture in decoding order.
...

Hereinafter, signaling of information on virtual boundaries which may be used in in-loop filtering will be described. Embodiments may be applicable independently. Alternatively, at least two embodiments may be applicable in combination.

In an embodiment of the present document, whether syntax elements for indicating virtual boundaries are included in the SPS may be controlled by a flag (e.g., SPS virtual boundaries present flag).

In an example according to the present embodiment, a virtual boundaries enabled flag (e.g., sps_virtual_boundaries_enabled_flag) may indicate whether a feature for disabling a loop filter across virtual boundaries is enabled.

In an example according to the present embodiment, an SPS virtual boundaries present flag (e.g., sps_virtual_boundaries_present_flag) may indicate whether signaling information for virtual boundaries is included in the SPS.

In an example according to the present embodiment, when the virtual boundaries enabled flag (e.g., sps_virtual_boundaries_enabled_flag) is 1 and the SPS virtual boundaries present flag (e.g., sps_virtual_boundaries_present_flag) is 0, signaling information for disabling a loop filter which is across virtual boundaries may be included in a picture header.

In an example according to the present embodiment, when information on positions of virtual boundaries (e.g., vertical virtual boundaries, horizontal virtual boundaries) is included in the SPS, a sum of the number of vertical virtual boundaries and the number of horizontal virtual boundaries may be limited to be greater than 0.

In an example according to the present embodiment, variable(s) indicate whether a filter is disabled in virtual boundaries for a current picture may be derived. For example, the variable(s) may include VirtualBoundairesDisabledFlag.

As one case of the present example, if the virtual boundaries enabled flag (e.g., sps_virtual_boundaries_enabled_flag) is 1 and the SPS virtual boundaries present flag (e.g., sps_virtual_boundaries_present_flag) is 1, then VirtualBoundairesDisabledFlag may be 1.

As another case of the present example, if the virtual boundaries enabled flag (e.g., sps_virtual_boundaries_enabled_flag) is 1, the SPS virtual boundaries present flag (e.g., sps_virtual_boundaries_present_flag) is 0, and information on the number of vertical virtual boundaries (e.g., ph_num_ver_virtual_boundaries) and a sum of information on the number of horizontal virtual boundaries (e.g., ph_num_hor_virtual_boundaries) is greater than 0, then VirtualBoundairesDisabledFlag may be 1.

In the other cases of the present example, VirtualBoundairesDisabledFlag may be 0.

In an embodiment of the present document, image information obtained by the encoding apparatus and/or image information obtained through a bitstream received from the encoding apparatus to the decoding apparatus may include a sequence parameter set (SPS) and a picture header (PH). The SPS may include a virtual boundaries enabled flag (sps_virtual_boundaries_enabled_flag). The SPS may include an SPS virtual boundaries present flag (sps_virtual_boundaries_present_flag), based on the virtual boundaries enabled flag.

For example, when a value of the virtual boundaries enabled flag is 1, the SPS may include the SPS virtual boundaries present flag. Based on the virtual boundaries enabled flag and the SPS virtual boundaries present flag, the SPS may include information on the number of SPS vertical virtual boundaries (sps_num_ver_virtual_boundaries), information on an SPS vertical virtual boundaries position (sps_virtual_boundaries_pos_x[i]), information on the number of SPS horizontal virtual boundaries (sps_num_hor_virtual_boundaries), and information on an SPS horizontal virtual boundaries position (sps_virtual_boundaries_pos_y[i]). For example, when a value of the virtual boundaries enabled flag is 1 and a value of the SPS virtual boundaries present flag is 1, the SPS may include virtual boundaries-related information. In an example, the virtual boundaries-related information may include information on the number of the SPS vertical virtual boundaries, information on the SPS vertical virtual boundaries position, information on the number of the SPS horizontal virtual boundaries, and/or information on the SPS horizontal virtual boundaries position.

In an example, the number of pieces of information on the SPS vertical virtual boundaries position may be determined based on the information on the number of the SPS vertical virtual boundaries, and the number of pieces of information on the SPS horizontal virtual boundaries position may be determined based on the information on the number of the SPS horizontal virtual boundaries. Based on the virtual boundaries enabled flag and the SPS virtual boundaries present flag, the picture header may include information on the number of PH vertical virtual boundaries (ph_num_ver_virtual_boundaries), information on a PH vertical virtual boundaries position (ph_virtual_boundaries_pos_x[i]), information on the number of PH horizontal virtual boundaries (ph_num_hor_virtual_boundaries), and information on a PH horizontal virtual boundaries position (ph_virtual_boundaries_pos_y[i]).

For example, if a value of the virtual boundaries enabled flag is 1, a value of the SPS virtual boundaries present flag is 0, and a value of the PH virtual boundaries present flag is 1, then the PH may include virtual boundaries-related information. In an example, the virtual boundaries-related information may include information on the number of the PH vertical virtual boundaries, information on the PH vertical virtual boundaries position, information on the number of the PH horizontal virtual boundaries, and/or information on the PH horizontal virtual boundaries position.

It is possible to include information on the number of the PH vertical virtual boundaries, information on the PH vertical virtual boundaries position, information on the number of the PH horizontal virtual boundaries, and information on the PH horizontal virtual boundaries position. In an example, the number of pieces of information on the PH vertical virtual boundaries position may be determined based on the information on the number of the PH vertical virtual boundaries, and the number of piece s of information on the PH horizontal virtual boundaries position may be determined based on the information on the number of the PH horizontal virtual boundaries.

According to embodiments of the present document together with the tables above, information for performing in-loop filtering across virtual boundaries may be effectively signaled. For example, in-loop filtering may be performed based on signaling of information related to whether in-loop filtering is available across the virtual boundaries.

Figure 7:
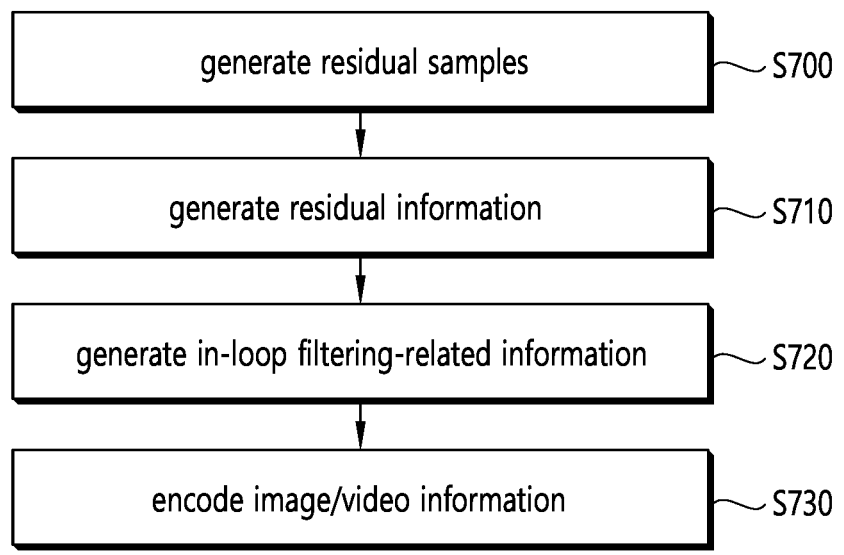
FIG. 7 and FIG. 8 schematically show an example of a video/image encoding method and related components according to embodiment(s) of the present document.
Figure 8:
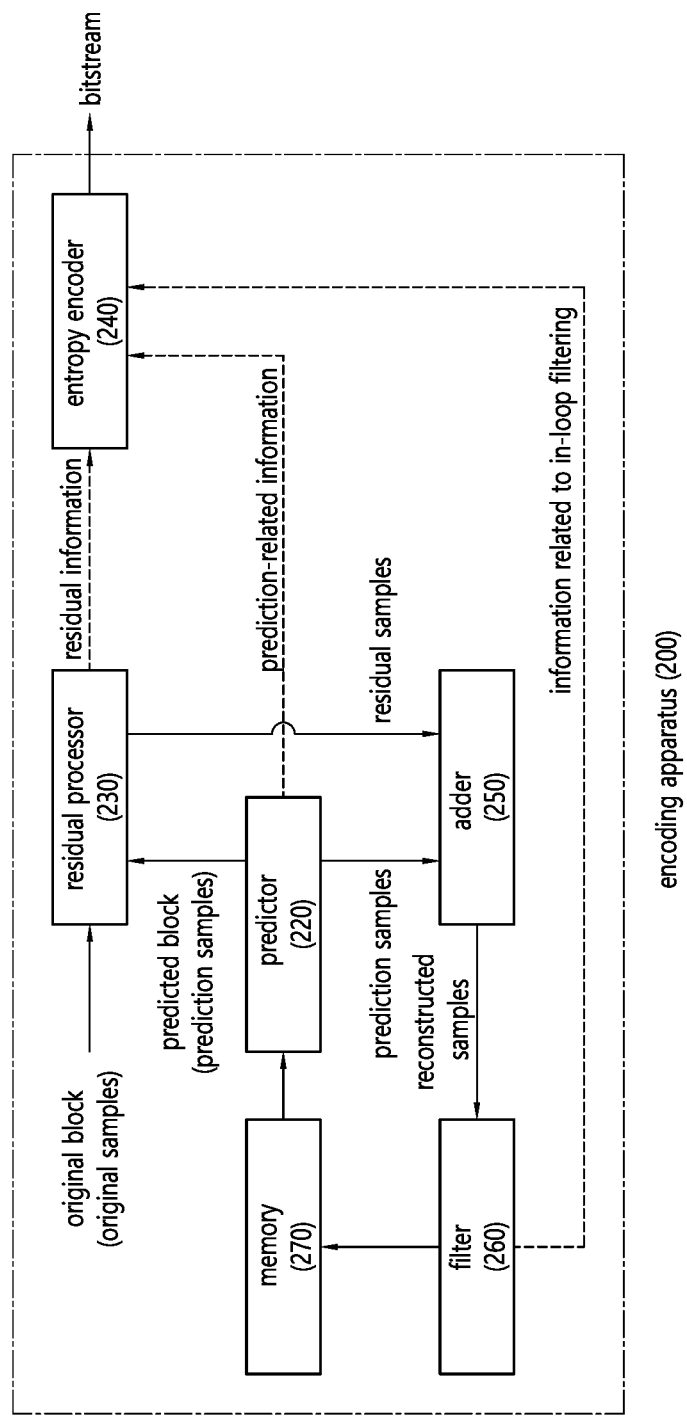

FIG. 7 and FIG. 8 schematically show an example of a video/image encoding method and related components according to embodiment(s) of the present document.

The method disclosed in FIG. 7 may be performed by the encoding apparatus disclosed in FIG. 2 or FIG. 8. Specifically, for example, S700 and S710 of FIG. 7 may be performed by a residual processor 230 of the encoding apparatus of FIG. 8, S720 of FIG. 7 may be performed by a filter 260 of the encoding apparatus of FIG. 8, and S730 of FIG. 7 may be performed by an entropy encoder 240 of the encoding apparatus of FIG. 8. In addition, although not shown in FIG. 7, prediction samples or prediction-related information may be derived by a predictor 220 of the encoding apparatus of FIG. 7, and a bitstream may be generated from the residual information or the prediction-related information by the entropy encoder 240 of the encoding device. The method disclosed in FIG. 7 may include the aforementioned embodiments in the present document.

Referring to FIG. 7, the encoding apparatus may derive residual samples (S700). The encoding apparatus may derive residual samples for a current block, and the residual samples for the current block may be derived based on original samples and prediction samples of the current block. Specifically, the encoding apparatus may derive the prediction samples of the current blocks, based on a prediction mode. In this case, various prediction methods disclosed in the present document, such as inter prediction or intra prediction, may be applied. The residual samples may be derived based on the prediction samples and the original samples.

The encoding apparatus may derive transform coefficients. The encoding apparatus may derive the transform coefficients, based on a transform procedure for the residual samples. For example, the transform procedure may include at least one of a discrete cosine transform (DCT), a discrete sine transform (DST), a graph-based transform (GBT), or a conditionally non-linear transform (CNT).

The encoding apparatus may derive quantized transform coefficients. The encoding apparatus may derive the quantized transform coefficients, based on a quantization procedure for the transform coefficients. The quantized transform coefficients may have a 1-dimensional vector form, based on a coefficient scan order.

The encoding apparatus may generate residual information (S710). The encoding apparatus may generate the residual information, based on the residual samples for the current block. The encoding apparatus may generate residual information indicating the quantized transform coefficients. The residual information may be generated through various encoding methods such as exponential Golomb, CAVLC, CABAC, or the like.

The encoding apparatus may generate reconstructed samples. The encoding apparatus may generate the reconstructed samples, based on the residual information. The reconstructed samples may be generated by adding the prediction sample and the residual samples based on the residual information. Specifically, the encoding apparatus may perform prediction (intra or inter prediction) on the current block, and may generate reconstructed samples, based on original samples and the prediction samples generated from the prediction.

The reconstructed samples may include reconstructed luma samples and reconstructed chroma samples. Specifically, the residual samples may include residual luma samples and residual chroma samples. The residual luma samples may be generated based on original luma samples and prediction luma samples. The residual chroma samples may be generated based on the original chroma samples and the prediction chroma samples. The encoding apparatus may derive transform coefficients for the residual luma samples (luma transform coefficients) and/or transform coefficients for the residual chroma samples (chroma transform coefficients). Quantized transform coefficients may include quantized luma transform coefficients and/or quantized chroma transform coefficients.

The encoding apparatus may generate information related to in-loop filtering for the reconstructed samples (S720). The encoding apparatus may perform an in-loop filtering procedure on the reconstructed samples, and may generate information related to the in-loop filtering, based on the in-loop filtering procedure. For example, the information related to the in-loop filtering may include the aforementioned information on virtual boundaries (the SPS virtual boundaries enabled flag, the picture header virtual boundaries enabled flag, the SPS virtual boundaries present flag, the picture header virtual boundaries present flag, information on positions of virtual boundaries, etc.).

The encoding apparatus may encode video/image information (S730). The image information may include residual information, prediction-related information, and in-loop filtering-related information. The encoded video/image information may be output in the form of a bitstream. The bitstream may be transmitted to a decoding apparatus through a network or a storage medium.

The image/video information may include a variety of information according to an embodiment of the present document. For example, the image/video may include information disclosed in at least one of the table 1 to 8 above.

In an embodiment, the in-loop filtering-related information may include a virtual boundaries enabled flag (e.g., sps_virtual_boundaries_enabled_flag) related to whether the in-loop filtering procedure is performed across the virtual boundaries. For example, the virtual boundaries enabled flag may indicate whether it is possible to disable the in-loop filtering procedure across the virtual boundaries. The in-loop filtering procedure may be performed across the virtual boundaries, based on the virtual boundaries enabled flag. Whether the in-loop filtering procedure is performed across the virtual boundaries may be determined based on the virtual boundaries enabled flag.

In an embodiment, the image information may include a sequence parameter set (SPS) including the virtual boundaries enabled flag.

In an embodiment, the SPS may further include an SPS virtual boundaries present flag (e.g., sps_virtual_boundaries_present_flag). A value of a picture header virtual boundaries present flag (e.g., ph_virtual_boundaries_present_flag) in a picture header for at least one picture which refers to the SPS may be determined based on the virtual boundaries enabled flag or the SPS virtual boundaries present flag.

In an embodiment, the value of the picture header virtual boundaries present flag may be 1 (or set or determined to 1), based on the virtual boundaries enabled flag with a value of 1 and the SPS virtual boundaries present flag with a value of 0.

In an embodiment, the image information may include a picture parameter set (PPS).

In an embodiment, the PPS may include a picture header virtual boundaries present flag (e.g., pps_virtual_boundaries_present_in_ph_flag) for a picture header which refers to the PPS. The picture header may include virtual boundaries-related information, based on the picture header virtual boundaries present flag with a value of 1.

In an embodiment, the PPS may include a picture header virtual boundaries present flag (e.g., pps_virtual_boundaries_present_in_ph_flag) for a picture header which refers to the PPS. The SPS may further include an SPS virtual boundaries present flag. A value of the picture header virtual boundaries present flag (e.g., pps_virtual_boundaries_present_in_ph_flag) may be 0 (or set or determined to 0), based on the SPS virtual boundaries present flag with a value of 1.

In an embodiment, the SPS may include a virtual boundaries gradual decoding refresh (GDR) usage specifying flag (e.g., virtual_boundaries_used_flag_gdr_only_flag).

In an embodiment, whether virtual boundaries-related information is signaled in the SPS or signaled in a picture header which refers to the SPS may be determined based on the virtual boundaries GDR usage specifying flag.

In an embodiment, the SPS may include an SPS virtual boundaries present flag (e.g., sps_virtual_boundaries_present_flag), based on the virtual boundaries GDR usage specifying flag with a value of 0.

In an embodiment, a picture header which refers to the SPS based on the virtual boundaries GDR usage specifying flag with a value of 1 may include a picture header virtual boundaries present flag (e.g., ph_virtual_boundaries_present_flag).

In an embodiment, the picture header may include a picture header virtual boundaries present flag (e.g., ph_virtual_boundaries_present_flag), based on that the current picture related to the picture header which refers to the SPS is refreshed.

In an embodiment, the picture header may include a picture header virtual boundaries present flag, based on a case where a picture order count (POC) of the current picture related to a picture header which refers to the SPS is greater than or equal to a POC of a GDR picture and the POC of the current picture is less than a POC of a recovery point.

Figure 9:
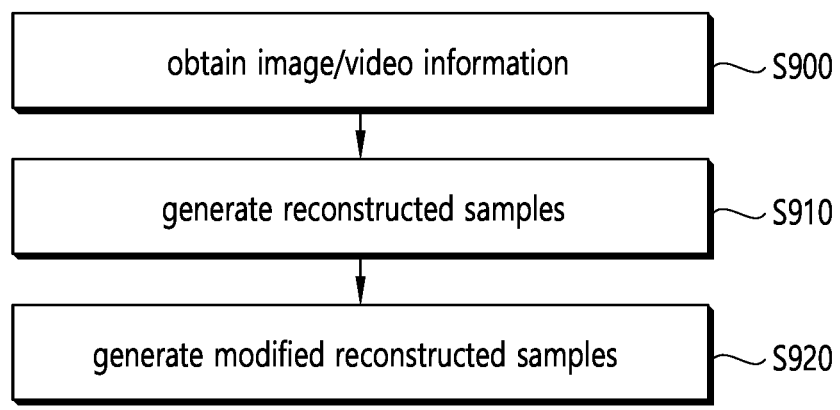
FIG. 9 and FIG. 10 schematically show an example of a video/image encoding method and related components according to embodiment(s) of the present document.
Figure 10:
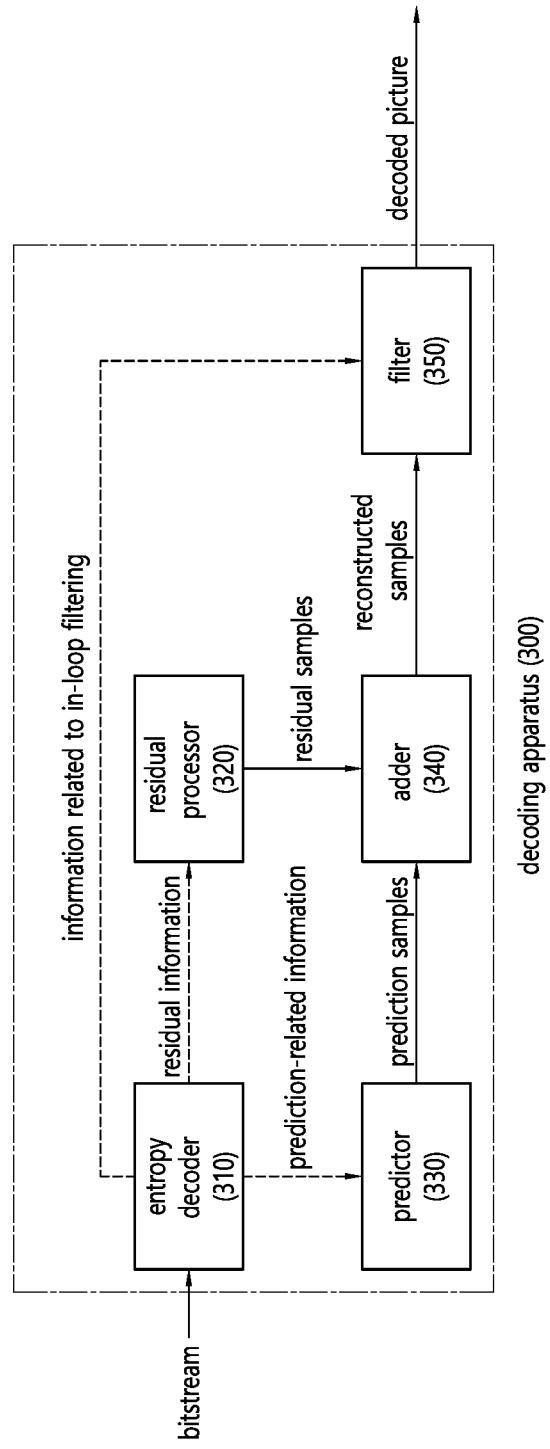

FIG. 9 and FIG. 10 schematically show an example of a video/image encoding method and related components according to embodiment(s) of the present document.

The method disclosed in FIG. 9 may be performed by the decoding apparatus disclosed in FIG. 3 or FIG. 10. Specifically, for example, S900 of FIG. 9 may be performed by an entropy decoder 310 of the decoding apparatus, S910 may be performed by a residual processor 320 and/or adder 340 of the decoding apparatus, and S920 may be performed by a filter 350 of the decoding apparatus. The method disclosed in FIG. 9 may include the aforementioned embodiments in the present document.

Referring to FIG. 9, the decoding apparatus may receive/obtain video/image information (S900). The video/image information may include at least one of residual information, prediction-related information, and/or in-loop filtering-related information (and/or virtual boundaries-related information). The decoding apparatus may receive/obtain the image/video information through a bitstream.

The image/video information may include a variety of information according to an embodiment of the present document. For example, the image/video may include information disclosed in at least one of the tables 1 to 8 above.

The decoding apparatus may derive quantized transform coefficients. The decoding apparatus may derive the quantized transform coefficients, based on the residual information. The quantized transform coefficients may have a 1-dimensional vector form, based on a coefficient scan order. Quantized transform coefficients may include quantized luma transform coefficients and/or quantized chroma transform coefficients.

The decoding apparatus may derive the transform coefficients. The decoding apparatus may derive the transform coefficients, based on a dequantization procedure for the quantized transform coefficients. The decoding apparatus may derive luma transform coefficients through dequantization, based on the quantized luma transform coefficients. The decoding apparatus may derive chroma transform coefficients through dequantization, based on the quantized chroma transform coefficients.

The decoding apparatus may generate/derive residual samples. The decoding apparatus may derive the residual samples, based on the inverse-transform procedure for the transform coefficients. The decoding apparatus may derive residual luma samples through the inverse-transform procedure, based on the luma transform coefficients. The decoding apparatus may derive residual chroma samples through the inverse-transform, based on the chroma transform coefficients.

The decoding apparatus may generate/derive reconstructed samples (S910). For example, the decoding apparatus may generate/derive reconstructed luma samples and/or reconstructed chroma samples. The decoding apparatus may generate the reconstructed luma samples and/or the reconstructed chroma samples, based on the residual information. The decoding apparatus may generate reconstructed samples, based on the residual information. The reconstructed samples may include the reconstructed luma samples and/or the reconstructed chroma samples. A luma component of the reconstructed samples may correspond to the reconstructed luma samples, and a chroma component of the reconstructed samples may correspond to the reconstructed chroma samples. The decoding apparatus may generate prediction luma samples and/or prediction chroma samples through a prediction procedure. The decoding apparatus may generate the reconstructed luma samples, based on the prediction luma samples and the residual luma samples. The decoding apparatus may generate the reconstruction chroma samples, based on the prediction chroma samples and the residual chroma samples.

The decoding apparatus may generate modified (filtered) reconstructed samples (S920). The decoding apparatus may generate the modified reconstructed samples by performing an in-loop filtering procedure for the reconstructed samples of the current picture. The decoding apparatus may generate the modified reconstructed samples, based on in-loop filtering-related information (and/or virtual boundaries-related information). The decoding apparatus may use a deblocking procedure, an SAO procedure, and/or an ALF procedure to generate the modified reconstructed samples.

In an embodiment, the image information may include an SPS. The SPS may include a virtual boundaries enabled flag (e.g., sps_virtual_boundaries_enabled_flag) related to whether the in-loop filtering procedure is performed across the virtual boundaries. For example, the virtual boundaries enabled flag may indicate whether it is possible to disable the in-loop filtering procedure across the virtual boundaries. The in-loop filtering procedure may be performed across the virtual boundaries, based on the virtual boundaries enabled flag. Whether the in-loop filtering procedure is performed across the virtual boundaries may be determined based on the virtual boundaries enabled flag.

In an embodiment, the SPS may further include an SPS virtual boundaries present flag (e.g., sps_virtual_boundaries_present_flag). A value of a picture header virtual boundaries present flag (e.g., ph_virtual_boundaries_present_flag) in a picture header for at least one picture which refers to the SPS may be determined based on the virtual boundaries enabled flag or the SPS virtual boundaries present flag.

In an embodiment, the value of the picture header virtual boundaries present flag may be 1 (or set or determined to 1), based on the virtual boundaries enabled flag with a value of 1 and the SPS virtual boundaries present flag with a value of 0.

In an embodiment, the image information may include a PPS.

In an embodiment, the PPS may include a picture header virtual boundaries present flag (e.g., pps_virtual_boundaries_present_in_ph_flag) for a picture header which refers to the PPS. The picture header may include virtual boundaries-related information, based on the picture header virtual boundaries present flag with a value of 1.

In an embodiment, the PPS may include a picture header virtual boundaries present flag (e.g., pps_virtual_boundaries_present_in_ph_flag) for a picture header which refers to the PPS. The SPS may further include an SPS virtual boundaries present flag. A value of the picture header virtual boundaries present flag (e.g., pps_virtual_boundaries_present_in_ph_flag) may be 0 (or set or determined to 0), based on the SPS virtual boundaries present flag with a value of 1.

In an embodiment, the SPS may include a virtual boundaries GDR usage specifying flag (e.g., virtual_boundaries_used_flag_gdr_only_flag).

In an embodiment, whether virtual boundaries-related information is signaled in the SPS or signaled in a picture header which refers to the SPS may be determined based on the virtual boundaries GDR usage specifying flag.

In an embodiment, the SPS may include an SPS virtual boundaries present flag (e.g., sps_virtual_boundaries_present_flag), based on the virtual boundaries GDR usage specifying flag with a value of 0.

In an embodiment, a picture header which refers to the SPS based on the virtual boundaries GDR usage specifying flag with a value of 1 may include a picture header virtual boundaries present flag (e.g., ph_virtual_boundaries_present_flag).

In an embodiment, the picture header may include a picture header virtual boundaries present flag (e.g., ph_virtual_boundaries_present_flag), based on that the current picture related to the picture header which refers to the SPS is refreshed.

In an embodiment, the picture header may include a picture header virtual boundaries present flag, based on a case where a POC of the current picture related to a picture header which refers to the SPS is greater than or equal to a POC of a GDR picture and the POC of the current picture is less than a POC of a recovery point.

When the residual sample for the current block exists, the decoding apparatus may receive the information on the residual for the current block. The information on the residual may include the transform coefficients on the residual samples. The decoding apparatus may derive the residual samples (or residual sample array) for the current block based on the residual information. Specifically, the decoding apparatus may derive the quantized transform coefficients based on the residual information. The quantized transform coefficients may have a one-dimensional vector form based on a coefficient scan order. The decoding apparatus may derive the transform coefficients based on the dequantization process for the quantized transform coefficients. The decoding apparatus may derive the residual samples based on the transform coefficients.

The decoding apparatus may generate a reconstructed samples based on the (intra) prediction samples and residual samples, and may derive the reconstructed block or the reconstructed picture based on the reconstructed samples. Specifically, the decoding apparatus may generate reconstructed samples based on a sum between the (intra) prediction samples and the residual samples. Thereafter, as described above, the decoding apparatus may apply an in-loop filtering process such as deblocking filtering and/or SAO process to the reconstructed picture in order to improve the subjective/objective picture quality, if necessary For example, the decoding apparatus may obtain image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 11:
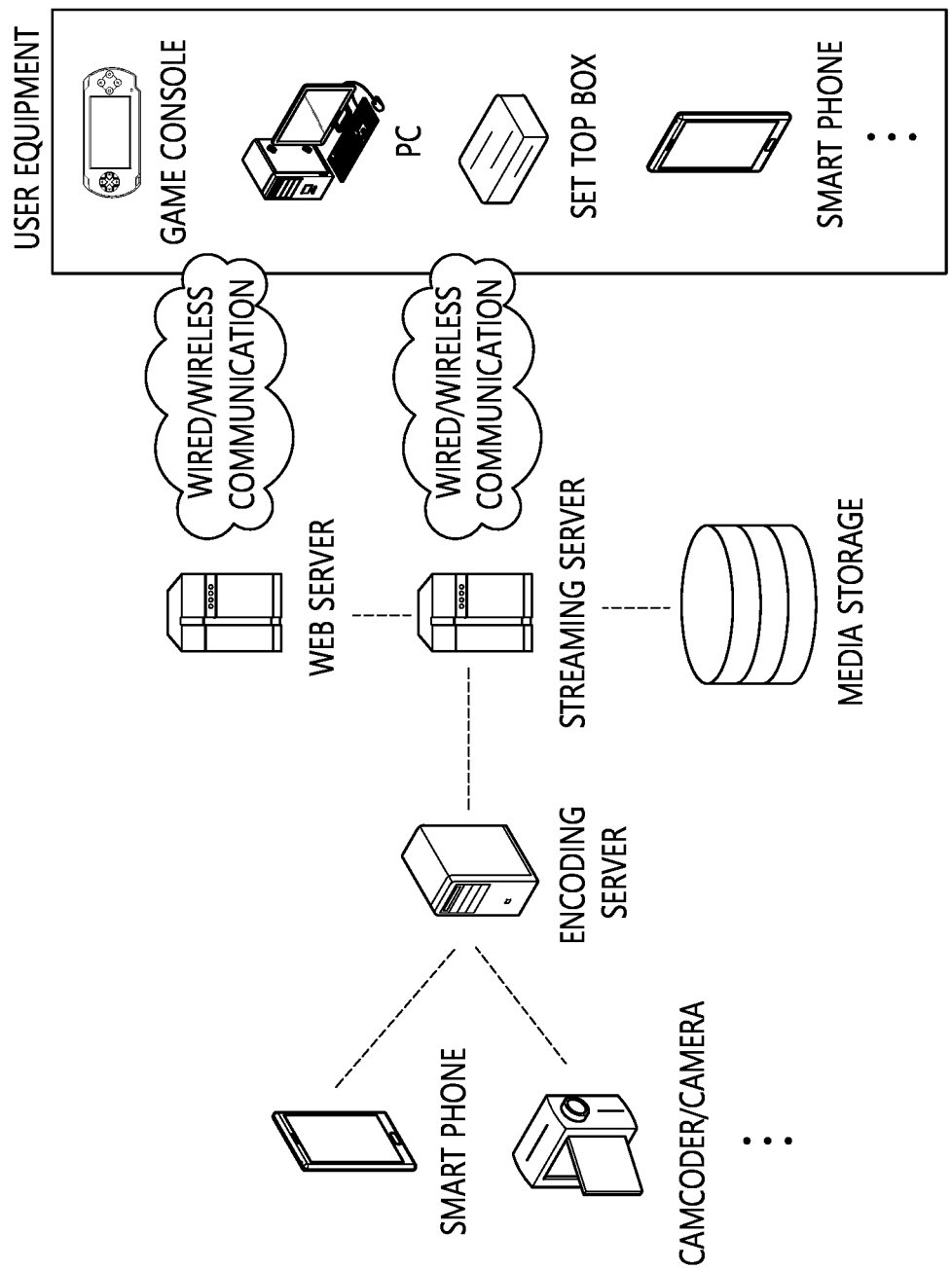
FIG. 11 represents an example of a contents streaming system to which the embodiment of the present document may be applied.

FIG. 11 represents an example of a contents streaming system to which the embodiment of the present document may be applied.

Referring to FIG. 11, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, comprising:
    obtaining image information including residual information through a bitstream;
    generating reconstructed samples of a current picture, based on the residual information; and
    generating modified reconstructed samples, based on an in-loop filtering procedure for the reconstructed samples,
    wherein the image information includes a sequence parameter set (SPS),
    wherein the SPS includes a virtual boundaries enabled flag, and
    wherein the in-loop filtering procedure is performed across the virtual boundaries, based on the virtual boundaries enabled flag,
    wherein the SPS includes a virtual boundaries gradual decoding refresh (GDR) usage specifying flag, and
    wherein the SPS includes an SPS virtual boundaries present flag, based on the virtual boundaries GDR usage specifying flag with a value of 0.

2. The image decoding method of claim 1,
    wherein the SPS includes the virtual boundaries GDR usage specifying flag, and
    wherein whether virtual boundaries-related information is signaled in the SPS or signaled in a picture header which refers to the SPS is determined based on the virtual boundaries GDR usage specifying flag.

3. The image decoding method of claim 1, wherein a picture header which refers to the SPS based on the virtual boundaries GDR usage specifying flag with a value of 1 includes a picture header virtual boundaries present flag.

4. The image decoding method of claim 1, wherein a picture header includes a picture header virtual boundaries present flag, based on that the current picture related to the picture header which refers to the SPS is refreshed.

5. The image decoding method of claim 1, wherein a picture header includes a picture header virtual boundaries present flag, based on a case where a picture order count (POC) of the current picture related to the picture header which refers to the SPS is greater than or equal to a POC of a GDR picture and the POC of the current picture is less than a POC of a recovery point.

6. An image encoding method performed by an encoding apparatus, comprising:
    generating residual samples for a current block;
    generating residual information, based on the residual samples for the current block;
    generating in-loop filtering-related information for reconstructed samples of a current picture; and
    encoding image information including the residual information and the in-loop filtering-related information,
    wherein the in-loop filtering-related information includes a virtual boundaries enabled flag related to whether an in-loop filtering procedure is performed across virtual boundaries,
    wherein the image information includes an SPS including the virtual boundaries enabled flag,
    wherein the SPS includes a virtual boundaries gradual decoding refresh (GDR) usage specifying flag, and
    wherein the SPS includes an SPS virtual boundaries present flag, based on the virtual boundaries GDR usage specifying flag with a value of 0.

7. The image encoding method of claim 6,
    wherein the image information includes the SPS including the virtual boundaries enabled flag,
    wherein the SPS includes the virtual boundaries GDR usage specifying flag, and
    wherein whether virtual boundaries-related information is signaled in the SPS or signaled in a picture header which refers to the SPS is determined based on the virtual boundaries GDR usage specifying flag.

8. The image encoding method of claim 6, wherein a picture header which refers to the SPS based on the virtual boundaries GDR usage specifying flag with a value of 1 includes a picture header virtual boundaries present flag.

9. The image encoding method of claim 6, wherein a picture header includes a picture header virtual boundaries present flag, based on that the current picture related to the picture header which refers to the SPS is refreshed.

10. A transmission method of data for an image, the method comprising:
    obtaining a bitstream for the image, wherein the bitstream is generated based on generating residual samples for a current block, generating residual information, based on the residual samples for the current block, generating in-loop filtering-related information for reconstructed samples of a current picture, and encoding image information including the residual information and the in-loop filtering-related information; and
    transmitting the data comprising the bitstream,
    wherein the in-loop filtering-related information includes a virtual boundaries enabled flag related to whether an in-loop filtering procedure is performed across virtual boundaries, wherein the image information includes an SPS including the virtual boundaries enabled flag, wherein the SPS includes a virtual boundaries gradual decoding refresh (GDR) usage specifying flag, and wherein the SPS includes an SPS virtual boundaries present flag, based on the virtual boundaries GDR usage specifying flag with a value of 0.

* * * * *